United States Patent [19]

Minns et al.

[11] Patent Number: 5,024,507

[45] Date of Patent: Jun. 18, 1991

[54] PHOTOPOLYMERIZABLE COMPOSITION FOR CLADDING OPTICAL FIBERS

[75] Inventors: Richard A. Minns, Arlington; Iris B. K. Bloom, Quincy, both of Mass.; Roopram Ramharack, Queens, N.Y.

[73] Assignee: Polaroid Corporation, Cambridge, Mass.

[21] Appl. No.: 521,671

[22] Filed: May 10, 1990

[51] Int. Cl.⁵ ............................ G02B 1/04; G02B 6/16
[52] U.S. Cl. ........................... 350/96.34; 427/54.1; 427/163; 430/286; 526/242
[58] Field of Search ............... 350/96.29, 96.30, 96.31, 350/96.33, 96.34; 427/163, 54.1; 430/286, 291; 526/242-246

[56] References Cited

U.S. PATENT DOCUMENTS

| | | | |
|---|---|---|---|
| 4,198,242 | 4/1980 | Pazos | 430/286 |
| 4,269,933 | 5/1981 | Pazos | 430/291 |
| 4,427,823 | 1/1984 | Inagaki et al. | 524/833 |
| 4,469,724 | 9/1984 | Klinger | 427/54.1 |
| 4,479,984 | 10/1984 | Levy et al. | 427/54.1 |
| 4,508,916 | 4/1985 | Newell et al. | 556/420 |
| 4,511,209 | 4/1985 | Skutnik | 350/96.34 |
| 4,554,339 | 11/1985 | Hockemeyer et al. | 528/26 |
| 4,558,082 | 12/1985 | Eckberg | 524/104 |
| 4,568,566 | 2/1986 | Tolentino | 427/54.1 |
| 4,572,610 | 2/1986 | Krajewski | 350/96.34 |
| 4,597,987 | 7/1986 | Hockemeyer et al. | 427/54.1 |
| 4,617,350 | 10/1986 | Maeda et al. | 525/153 |
| 4,663,185 | 5/1987 | Eckberg | 427/54.1 |
| 4,690,503 | 9/1987 | Janssen et al. | 350/96.30 |
| 4,914,171 | 4/1990 | Zweig | 526/246 |

OTHER PUBLICATIONS

Blyler and Aloisio, Polymer Coatings for Optical Fibers, Chemtech, Nov. 1987, pp. 680-684.

Primary Examiner—John D. Lee
Attorney, Agent, or Firm—David J. Cole

[57] ABSTRACT

A photopolymerizable composition for cladding optical fibers comprises an unsubstituted or fluorosubstituted diacrylate monomer; a fluorinated monofunctional acrylate monomer in an amount of from about 2 to about 12 parts by weight per part by weight of the diacrylate monomer; a photoinitiator; and a viscosity modifying agent to increase the viscosity of the composition to about 1000 to about 15000 cP. Upon photocuring, the composition has a refractive index not greater than about 1.43, and preferably not greater than about 1.40.

34 Claims, 1 Drawing Sheet

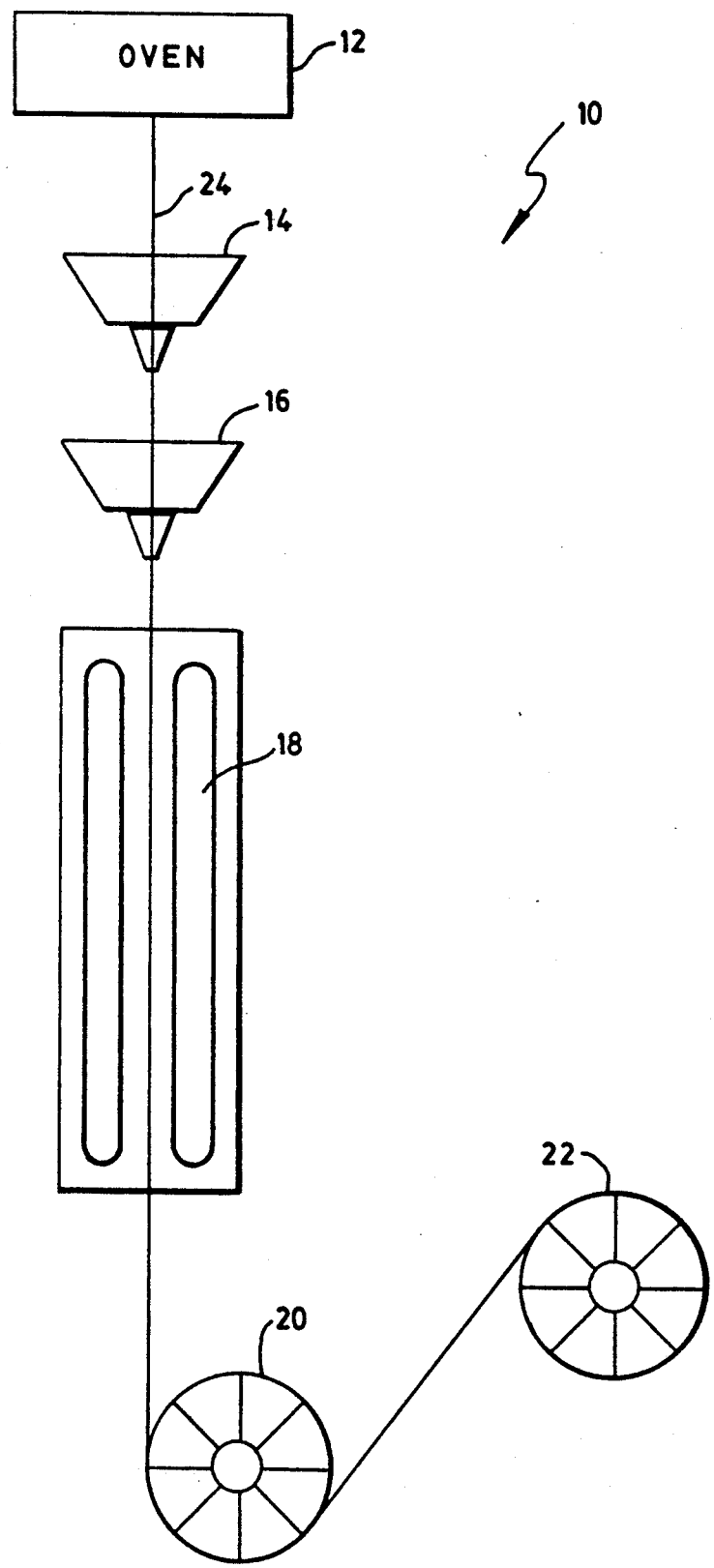

PHOTOPOLYMERIZABLE COMPOSITION FOR CLADDING OPTICAL FIBERS

BACKGROUND OF THE INVENTION

This invention relates to a photopolymerizable composition for cladding optical fibers.

As discussed in, for example, Blyler and Aloisio, Polymer coatings for optical fibers, Chemtech, November 1987, pages 680–684, optical fibers consist of a central core, usually a highly transparent glass (silica, often containing various doping materials) surrounded by a cladding with a refractive index lower than that of the glass; this cladding serves to confine light within the central core in order to reduce radiation losses from the surface of the core, and hence reduce attenuation of radiation travelling along the core.

In most optical fibers, the cladding is formed from a second glass. Because minor flaws in such a glass cladding greatly reduce the tensile strength of the optical fiber, it is customary to provide the fiber with a secondary, protective cladding, which is usually formed from a polymeric material. For example, U.S. Pat. No. 4,558,082, issued Dec. 10, 1985, and U.S. Pat. No. 4,663,185, issued May 5, 1987, describe acrylated silicone polymers useful as, inter alia, optical fiber claddings. These silicone polymers are prepared by reacting limonene oxide-functional silicones with acrylic acid or a substituted acrylic acid in the presence of a catalyst, which can be a tetraalkylurea or a tetraalkylguanidine.

Acrylic resins have also been used as protective claddings for optical fibers. U.S. Pat. No. 4,427,823 describes an uncured, filled coating composition comprising 100 parts by weight of (a) a polyfunctional acrylic-type carboxylic acid ester monomer or its prepolymer, this monomer or prepolymer being composed of 0 to 75 percent by weight tri- or higher acrylates, and 25 to 100 percent diacrylate; (b) 0.001 to 20 parts by weight of a polymerization initiator; and (c) 5 to 250 parts by weight of an inorganic solid filler having a refractive index of 1.40 to 1.60 and an average first-order particle diameter of at least 1 m$\mu$ but less than 1 $\mu$.

U.S. Pat. No. 4,479,984, issued Oct. 30, 1984, describes multifilament bundles (which can be optical fiber bundles) impregnated with an ultraviolet curable resin to form a composite material suitable for use as a strength member. Among the resins which can be used in such bundles are various acrylate resins.

U.S. Pat. No. 4,690,503, issued Sept. 1, 1987, describes a glass optical fiber having a primary coating constructed of two layers of ultraviolet cured acrylate resin. The first, inner layer has a modulus of elasticity at 25° C. less than or equal to 5 N/mm$^2$., while the second, outer layer has a modulus of elasticity at 25° C. of from 25 to 1500 N/mm$^2$., the ratio of the thickness of the first layer to the thickness of the second layer being between 0.5 and 2.

U.S. Pat. No. 4,572,610, issued Feb. 25, 1986, describes the cladding of optical fibers by contact with a coating composition comprising (a) a radiation-curable diethylenically unsaturated polyurethane resin constituted by an essentially saturated, halogenated, dihydroxy-terminated linear liquid polybutadiene polymer reacted with an organic isocyanate and a monoethylenically unsaturated monomer carrying a single hydroxy group, to form a diethylenic diurethane having a halogen-containing, essentially saturated polybutadiene backbone; and (b) a liquid solvent for the resin (a), this solvent being preferably a monoethylenically unsaturated liquid having a low glass transition temperature. The coating composition is cured to produce the final cladding, which has a high refractive index, above 1.48.

U.S. Pat. No. 4,469,724, issued Sept. 4, 1984, describes protecting optical fibers against stress corrosion by first coating the optical fiber with a primary coating of an ultraviolet curable, cis, trans fluoropolyolacrylate in which the modulus is reduced by eliminating about 25 percent of the pendant ester groups, curing the primary coating, applying a secondary coating of a high-modulus, heat-curable fluoroepoxy or a high-modulus ultraviolet-curable cis, trans fluoropolyolacrylate over the primary coating, and curing the secondary coating. The cis, trans fluoropolyolacrylates used must contain aromatic and oxirane rings.

However, in some cases it is possible to form the primary cladding of the optical fiber (i.e., the cladding immediately adjacent the core) from a polymeric material. According to the aforementioned Blyler and Aloisio article, polymer-clad fibers usually consist of a silica core clad with either a poly(dimethylsiloxane) resin or a fluorinated acrylic polymer. For example, U.S. Pat. No. 4,568,566, issued Feb. 4, 1986, describes photocurable silicone compositions, useful as optical fiber claddings, which compositions contain chemically combined siloxy units and units of the formula $R_2SiO$, where a number of the R units are acrylate or alkyl-substituted acrylate ester groupings.

U.S. Pat. No. 4,554,339, issued Nov. 19, 1985, and U.S. Pat. No. 4,597,987, issued Jul. 1, 1986, describe organopolysiloxanes having a viscosity of 100 mPa. at 25° C. and having both SiC-bonded acryloxyalkyl groups and Si-bonded hydrogen atoms in the same molecule. These organopolysiloxanes are prepared by adding an allyl alcohol to a diorganopolysiloxane containing a terminal Si-bonded hydrogen atom, then esterifying the hydroxyl groups of the resultant reaction product with acrylic acid and subsequently equilibriating the resultant diorganopolysiloxane with an organo(poly)siloxane containing an Si-bonded hydroxyl group in each of the terminal units. The final organopolysiloxane is stated to be useful as, inter alia, an optical fiber cladding, although it is not clear whether this refers to a primary or secondary cladding.

However, silicone primary claddings have a number of serious disadvantages. The viscosity and curing requirements of the silicones restrict the production rate of the clad fiber to about 0.5 meters/sec. Silicone claddings do not adhere well to quartz, and the softness of the cladding leads to difficulties in connecting the clad fiber to other components of the optical system; temperature changes can cause the quartz core to be forced into and out of the cladding at the connection. Furthermore, according to U.S. Pat. No. 4,511,209, exposing the silicone-clad optical fibers to low temperatures in the range of −40° to −50° C. results in an increase in attenuation of 10–20 dB/km.; in many cases an increase in room temperature attenuation occurs after the fiber has been exposed to such low temperatures.

It is also known that fluorine-containing materials can be incorporated into claddings containing acrylates and methacrylates. For example, U.S. Pat. No. 4,508,916, issued Apr. 2, 1985, describes curable substituted urethane acrylates and methacrylates having an aliphatic backbone with at least one pendant fluorinated organic group attached thereto, this backbone being end-capped with an acrylic or methacrylic group.

U.S. Pat. No. 4,617,350, issued Oct. 14, 1986, describes a thermoplastic resin useful for optical purposes, including optical fiber claddings, and obtained by blending a polymer of an acrylic ester with a copolymer of vinylidene fluoride and hexafluoroacetone. The refractive index of the blend is in the range of 1.37 to 1.48.

European Patent Application Publication No. 196,212, published Oct. 1, 1986, describes a curable adhesive composition suitable for splicing optical fibers, or connecting optical fibers to other optical elements. This composition comprises a fluoroacrylate having the formula:

$$(R_1)_2CH(CF_2)_nCH(R_2)_2$$

wherein $R_1$ and $R_2$ are acrylate, methacrylate or hydrogen, n is an integer of 1 through 5, and at least one $R_1$ is acrylate or methacrylate and at least one $R_2$ is acrylate or methacrylate. The composition may also contain a polyfunctional acrylate or methacrylate monomer having 2 to 7 acrylate or methacrylate groups, this polyfunctional monomer allowing adjustment of the refractive index of the adhesive composition to precisely match the optical fiber refractive index. The composition may also contain an acrylate or methacrylate oligomer which does not affect the refractive index and is used to adjust the viscosity of the uncured composition to the desired level.

U.S. Pat. No. 4,511,209, issued Apr. 16, 1985 to Skutnik, describes a curable composition for use in cladding optical fibers, this composition comprising (a) a highly fluorinated monofunctional acrylate with a refractive index below 1.38 and constituting more than 50 percent by weight of the composition; (b) a trifunctional or higher acrylate that serves as a cross-linking agent; (c) a mono- or polyfunctional thiol that functions as a synergist; and (d) a photoinitiator. The resultant claddings have refractive indices in the range of about 1.39 to about 1.43.

The use of a thiol in this composition poses obvious pollution and environmental problems. Thiols are notorious for their obnoxious smells and also tend to be toxic. Although Skutnik does suggest the use of certain "low odor thiols", it would be advantageous to avoid the use of thiols entirely. In addition, to produce a composition with the viscosity needed to coat an optical fiber, it is sometimes necessary to include a solvent in the composition (some of the fluoroacrylates are solids at room temperature). The need for such a solvent imposes additional costs and environmental problems, especially if a chlorinated solvent, such as the methylene chloride used in some of Skutnik's Examples, is required. In addition, as noted by Blyler and Aloisio, supra, it is desirable to avoid solvents in cladding compositions because solvent removal is a slow process and the cladding must solidify quickly once it is applied to the optical fiber, in order that the fiber may be protected before it contacts any solid surface, such as the capstan used to draw the optical fiber.

It has also been found that very hard claddings, such as those produced by the Skutnik compositions, tend to produce microbends in an optical fiber, thus increasing the attenuation of the fiber.

There is thus a need for a photocurable composition for optical fibers which will produce claddings having suitably low refractive indices, which can be prepared without need for tri- or higher acrylates or thiols, and which produces coatings having a desirable degree of softness. This invention provides such a photocurable composition.

SUMMARY OF THE INVENTION

This invention provides a photopolymerizable composition capable of being polymerized upon exposure to ultraviolet light, the composition forming upon photocuring a cured composition having a refractive index not greater than about 1.43, and comprising a substantially homogeneous mixture of:

a) an unsubstituted or fluorosubstituted diacrylate monomer;

b) a fluorinated monofunctional acrylate monomer in an amount of from about 2 to about 12 parts by weight per part by weight of the diacrylate monomer;

c) a photoinitiator; and d) a viscosity modifying agent in an amount sufficient to increase the viscosity of the composition to a value in the range of from about 1000 to about 15000 cP.

This invention also provides a process for cladding an optical fiber, which process comprises contacting said fiber with a photopolymerizable composition comprising a substantially homogeneous mixture of:

a) an unsubstituted or fluorosubstituted diacrylate monomer;

b) a fluorinated monofunctional acrylate monomer in an amount of from about 2 to about 12 parts by weight per part by weight of the diacrylate monomer;

c) a photoinitiator; and d) a viscosity modifying agent in an amount sufficient to increase the viscosity of the composition to a value in the range of from about 1000 to about 15000 cP., thereby coating the optical fiber with a layer of the photopolymerizable composition, and thereafter exposing the coated optical fiber to ultraviolet light, thereby curing the photopolymerizable composition to produce on the optical fiber a cladding having a refractive index not greater than about 1.43.

BRIEF DESCRIPTION OF THE DRAWING

The accompanying drawing shows schematically an apparatus which can be used to carry out the process of the invention.

DETAILED DESCRIPTION OF THE INVENTION

The diacrylate monomer used in the compositions of the present invention may be unsubstituted or fluorosubstituted. When unsubstituted, this diacrylate monomer is desirably a diacrylate of an alpha,omega alkylene diol containing from about 4 to about 12 carbon atoms, preferably the diacrylate of 1,6-hexanediol (this diacrylate will hereinafter be referred to as HDDA). When the diacrylate monomer is fluorosubstituted, it desirably contains from about 25 to about 60 percent by weight fluorine. A preferred group of fluorosubstituted diacrylate monomers are those of the formulae:

$$CH_2=CH-CO-OCH_2-X-CH_2-O-CO-CH=CH_2$$

and $$X'-SO_2N(CH_2CH_2-O-CO-CH=CH_2)_2$$

where X is a perfluoroalkylene grouping, or a perfluoroalkylene grouping in which one or more carbon atoms have been replaced by —O— linkages, and X' is a perfluoroalkyl group. Diols suitable for preparing these diacrylates are available from Minnesota Mining and Manufacturing Company, St. Paul, Minn., and below, the tradenames of these diols are given alongside the formulae of the diacrylates. Specific diacrylates of the foregoing formulae suitable for use in the present invention are:

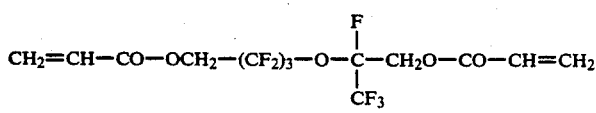  L-9347

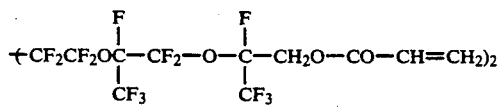  L-9939

$CF_3—(CF_2)_7—SO_2N+CH_2CH_2O—CO—CH=CH_2)_2$  L-6997

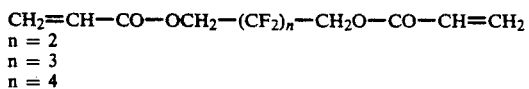
n = 2  L-9219
n = 3  L-9357
n = 4  L-9220

$CH_2=CH—CO—OCH_2CF_2O(CF_2CF_2O)_m(CF_2O)_n—CF_2—CH_2O—CO—CH=CH_2$  FC-2202

A specific preferred fluorosubstituted diacrylate monomer is 2,2,3,3,4,4,5,5-octafluorohexamethylene diacrylate, hereinafter referred to simply as octafluorohexamethylene diacrylate; when used in association with other compatible components, as described below, this compound has been found to give claddings with low refractive indices and a desirable degree of softness.

Whether an unsubstituted or fluorosubstituted diacrylate monomer is desirable in any specific composition of the present invention depends upon the refractive index and hardness required in the cured cladding. Fluorodiacrylate monomers produce claddings with lower refractive indices than claddings produced from similar compositions containing unsubstituted monomers, the refractive index decreasing as the proportion of fluorine in the fluorodiacrylate monomer increases.

The fluorinated monofunctional acrylate monomer used in the compositions of the present invention should be one in which a minimum of three C—F bonds exist and in which at least 25 percent of the C—H bonds in the corresponding unsubstituted monomer have been replaced with C—F bonds. Desirably, the monomer will contain from about 30 to about 65 percent by weight of fluorine. Preferred fluorinated monofunctional acrylate monomers are those of the formula:

$CH_2=CH—CO—OCH_2—Y—T$ where Y is a perfluoroalkylene grouping and T is fluorine or a —CF$_2$H group; a specific preferred monomer of this formula is 1H,1H-pentadecafluorooctyl acrylate. The fluorinated monofunctional acrylate monomer may also contain heteroatoms such as sulfur, oxygen and nitrogen; examples of such monomers are those of the formula:

$Z—SO_2—NR—CH_2—CH_2—O—CO—CA=CH_2$ where Z is H(CF$_2$)$_m$ or F(CF$_2$)$_m$, where m is an integer from 3 to 12, R is an alkyl group and A is hydrogen or methyl. Examples of commercially available monofunctional acrylate monomers which are useful in the present process (the figures in parentheses are the refractive index of the homopolymers) are 1H,1H,5H-octafluoropentylacrylate (1.380), trifluoroethylacrylate (1.407), and heptafluorobutylacrylate (1.367), all of which are available from PCR Incorporated, P.O. Box 1466, Gainesville, Fla. 32602, and (1.333)

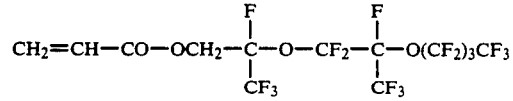

and

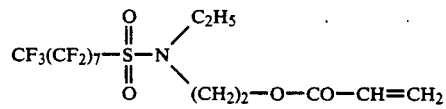

which are available from Minnesota Mining and Manufacturing Company, St. Paul, Minn. under the tradenames L-9911 and FX-13 respectively.

Since the diacrylate monomer acts as a crosslinking agent during curing of the composition, the ratio of diacrylate monomer to monofunctional acrylate monomer affects the hardness of the cured cladding, the hardness increasing with the proportion of diacrylate monomer used. The compositions of the present invention comprise from about 2 to about 12, and preferably about 3 to about 9 parts by weight of the fluorinated monofunctional acrylate monomer per part by weight of the diacrylate monomer. The ratio of diacrylate monomer to monofunctional acrylate monomer also affects the refractive index of the cured cladding, with this index increasing with the proportion of diacrylate monomer in the composition.

The photoinitiator used in the compositions of the present invention may be any of the photoinitiators conventionally used for curing acrylates using ultraviolet radiation, and numerous such photoinitiators will be known to those skilled in the art. Examples of such photoinitiators are those of the benzoin ether type, such as benzoin methyl ether, benzoin ethyl ether or benzoin isopropyl ether; substituted acetophenones such as 2,2-diethoxyacetophenone or 2,2-dimethoxy-2-phenylacetophenone; and substituted α-ketols such as 2-hydroxy-2-methylpropiophenone or 1-hydroxycyclohexyl phenyl ketone. One specific photoinitiator which has been found to give good results in the present compositions is 2,2-dimethoxy-2-phenylacetophenone (DMPA), which is available commercially from Aldrich Chemical Company and Ciba-Geigy. The photoinitiators are used in conventional amounts, typically from about 0.5 to 5 percent by weight of the total composition, with the optimum amount usually being around 2 percent by weight of the total composition.

A viscosity modifying agent is used in the compositions of the present invention in an amount sufficient to increase the viscosity of the compositions to a value in the range of from about 1000 to about 15000 cP. at 25° C. Without the viscosity modifying agent, the compositions have viscosities so low that simply passing an optical fiber through a bath of the composition will not produce an even coating of sufficient thickness of the composition to produce a useful cladding. Desirably, the amount of viscosity modifying agent used is sufficient to increase the viscosity of the composition to about 3000 to about 10000 cP. at 25° C. The viscosity modifying agent typically comprises from about 10 to about 25 percent by weight of the total composition.

It may sometimes be desirable, in order to produce coatings of varying thickness, to formulate a series of differing compositions having the same components but in which the amount of viscosity modifying agent varies, so as to vary the viscosity of the composition. In order to prepare such a series of differing compositions, it is convenient to mix the appropriate diacrylate monomer, fluorinated monofunctional acrylate monomer, and photoinitiator to form a pre-mixture, which can later be admixed with the desired amount of viscosity modifying agent.

The preferred viscosity modifying agents for use in the present compositions are fluorocarbon polymers having refractive indices not greater than about 1.40, especially copolymers of vinylidene fluoride and hexafluoropropylene, and terpolymers of vinylidene fluoride, hexafluoropropylene and tetrafluoroethylene. These copolymers and terpolymers are available commercially from Minnesota Mining and Manufacturing Company, St. Paul, Minn., under the trademark Fluorel, and from other companies. In general, in these polymers, the weight ratio of vinylidene fluoride to hexafluoropropylene is in the range of from 2.33:1 to 0.67:1, while the terpolymers generally contain from 3 to 35 percent by weight of tetrafluoroethylene and from 97 to 65 percent by weight of vinylidene fluoride and hexafluoropropylene. Within these weight ratios, the polymers are elastomeric.

These Fluorel polymers can be prepared by the copolymerization in known manner of a mixture of the corresponding monomers. An aqueous redox polymerization system can be used and polymerization can be initiated by resort to a conventional ammonium persulfate/sodium bisulfite system. Polymerization will normally be accomplished under pressure at moderately elevated temperatures. Suitable methods for the production of the polymers are known and are described in greater detail in U.S. Pat. No. 2,968,649, issued Jan. 17, 1961.

A specific preferred copolymer is that sold as Fluorel FC-2175. This material is stated by the manufacturer to be of the formula:

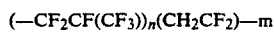

where m/n is approximately 4. The material has a refractive index of 1.370 and a glass transition temperature of −22° C.

Commercial forms of fluoropolymers may contain minor components produced as by-products during the synthesis of the polymers, or suited to a particular purpose but which may contribute to cloudiness and which are unsuitable for optical applications. These materials can, however, be filtered prior to use for removal of such components. It has been found that filtering a 5 percent solution of Fluorel FC-2175 in acetone under moderately elevated pressure through diatomaceous earth, or filtering a 25 percent solution of Fluorel FC-2175 in acetone through a 0.2 μ pleated nylon membrane, followed by evaporation of the acetone, gives a clarified product suitable for use in the present invention.

As already noted, unlike the compositions described in Skutnik, the compositions of the present invention do not require the incorporation of a thiol as a synergist, and there is no reason to incorporate any thiol in the present compositions. Accordingly, in view of the known problems associated with the use of thiols, it is strongly recommended that the present compositions be essentially free from thiols, i.e., that the compositions not contain an amount of a thiol which significantly affects the hardness of the cured composition.

It is important to ensure that the components of the present compositions are compatible with one another, such that not only do all the components form a single, substantially homogeneous phase prior to curing, but also that a single, substantially homogeneous solid phase is formed after curing. This single solid phase is believed to be a solid solution of the viscosity modifying agent in a copolymer of the diacrylate monomer with the fluorinated monofunctional acrylate monomer. The formation of a single, substantially homogeneous solid phase after curing is necessary to produce a clear cladding, since a cloudy cladding will greatly increase attenuation in an optical fiber.

Cladding of optical fibers by the process of the present invention may be effected using any of the conventional techniques known to those skilled in the art; the presently preferred technique is described in the Examples below.

The compositions of the present invention may be used for cladding any optical fibers. They may, for example, be used for cladding the fibers of optical fiber lasers, such as those described in U.S. Pat. No. 4,815,079, issued Mar. 21, 1989 to Snitzer et al. The fiber optic lasers described in this patent comprise a single-mode core disposed within a relatively large, multi-mode cladding such that the core is displaced from the center of the cross-section of the cladding. The cladding is surrounded by a further layer (second cladding) to prevent radiation from propagating out of the cladding. The compositions of the present invention may be used to form the second cladding of such a optical fiber laser, and permit the refractive index of this cladding to be such as to produce a numerical aperture (given by:

$$N.A. = (N_1^2 - N_2^2)^{\frac{1}{2}}$$

where $N_1$ is the refractive index of the first cladding and $N_2$ that of the second cladding) for the optical fiber of at least about 0.20. Indeed, preferred embodiments of the present invention can achieve numerical apertures of about 0.4 in such an optical fiber laser. The present compositions can, it has been found experimentally, give very satisfactory claddings even on optical fiber lasers of the form shown in FIG. 2 of the patent, in which the optical fiber laser is of elliptical rather than circular cross-section.

The present invention thus provides a photocurable composition for cladding optical fibers or other articles, which will produce claddings having refractive indices below 1.43; the refractive indices of some of the cured compositions are below 1.38. The cured claddings can be made sufficiently soft to avoid microbending of the clad fiber, but harder than conventional silicone claddings. The process of the present invention avoids the use of tri- or higher acrylates and thiols. Furthermore, the compositions of the present invention have viscosities which permit coatings of proper thickness to be produced on optical fibers without a need to introduce solvent into the composition.

The following Examples are now given, though by way of illustration only, to show details of preferred reagents, conditions and techniques used in the present invention.

EXAMPLES

Example 1: Preparation of octafluorohexamethylene diacrylate

This Example illustrates the preparation of a preferred diacrylate monomer for use in the process of the present invention.

50 g. (0.191 mole) of octafluorohexamethylene diol, 400 ml. of methylene chloride and 65 ml. (47.2 g., 0.466 mole) of triethylamine were placed in a 1000 ml. three-necked, round-bottomed flask equipped with a magnetic stirrer, a thermometer, a 250 ml. addition funnel and a condenser. The resultant solution was cooled with stirring in an ice-water bath to 5° C., and then a solution of 35 ml. acryloyl chloride (39.0 g., 0.431 mole) in 200 ml. of methylene chloride was added dropwise through the addition funnel at a rate of approximately one drop per second over a period of 3 hours, while the temperature of the solution was maintained at 5° C. Although a white solid began to precipitate after about half the acryloyl chloride had been added, the presence of this solid did not interfere with stirring.

After addition of the acryloyl chloride was complete, the resultant solution was stored in a refrigerator over a weekend, then washed successively with 200 ml. of water, 200 ml. of half-saturated sodium bicarbonate solution, 200 ml. of 5 percent hydrochloric acid and 200 ml. of water. The organic phase obtained after washing was filtered through cotton and the methylene chloride evaporated in a rotary evaporator to yield an amber oil. Analysis of this oil by gas chromatography on a polydimethylsiloxane packed column at a temperature of 125–150° C. with passage of 30 ml/min. of helium showed 91 percent diester and less than 1 percent monoester.

After addition of 10–20 mg. of di-tert-butylhydroquinone as a polymerization inhibitor, the product was distilled in a 250 ml. three-necked, round-bottomed flask equipped with a magnetic stirrer, a heating mantle, a thermometer, a 6 inch (152 mm.) Vigreux column and a variable reflux ratio still head connected to a vacuum pump through a manometer and a liquid nitrogen trap. Several milliliters of low boiling fractions (b.pt. 50°–90° C. at 0.5 mm.) were collected first, and then, at a reaction pot temperature of about 115° C., the diacrylate product distilled at 92–96° C. at 0.5 mm.; the pressure was not quite constant because the column tended to flood. At the end of the distillation, the dark brown residue in the flask polymerized to a fluffy, acetone swellable material.

The product was 60.1 g. (85 percent of theoretical) of a pale yellow liquid having $n_D^{21} = 1.3907$ and a specific gravity of 1.43 at 21° C. The product analyzed as 95 percent diacrylate by gas chromatography, and its identity was confirmed by infrared, and proton and fluorine NMR spectroscopy.

The reaction proceeds according to the equation:

$(CF_2CF_2CH_2OH)_2 + 2\ CH_2{=}CHCOCl + 2\ Et_3N =$

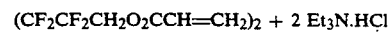
$(CF_2CF_2CH_2O_2CCH{=}CH_2)_2 + 2\ Et_3N\cdot HCl$

Example 2: Purification of viscosity modifying agent

This Example illustrates the purification of a commercially available polymer to produce a preferred viscosity modifying agent for use in the present invention.

25 g. of Fluorel FC-2175 (obtained from Minnesota Mining and Manufacturing Company, St. Paul, Minn.) were dissolved in 500 ml. of reagent grade acetone in a 1000 ml. Erlenmeyer flask; the Fluorel will dissolve overnight without stirring. A 1000 ml. flash chromatography column 50 mm. in diameter was slurry packed under house line nitrogen pressure (less than 15 psig.) with 25 g. of diatomaceous earth, using acetone as the liquid component of the slurry, to produce a layer of diatomaceous earth approximately 40 mm. thick.

The acetone solution of Fluorel was then filtered, under line nitrogen pressure, through the packed column; the column removed residual salts and other impurities. The column was washed several times with additional quantities of acetone, and all the eluates from the column were combined.

The combined eluates were then transferred to a 1000 ml. heavy walled, pear-shaped flask and evaporated on a rotary evaporator using a bath kept below 40° C. until about 100 ml. of the acetone solution remained. The resultant viscous solution was transferred to a pre-weighed 250 ml. round-bottomed flask, the residue remaining in the pear-shaped flask quantitatively rinsed into the round-bottomed flask with ethyl acetate, and the remaining solvents were removed on the rotary evaporator, care being taken to avoid bumping during this evaporation.

The round-bottomed flask was then placed in an unheated vacuum oven and dried to constant weight under full oil pump vacuum. The resultant purified Fluorel weighed approximately 25 g. and was pale yellow in color.

Example 3: Purification of viscosity modifying agent

This Example illustrates an alternative purification of a commercially available polymer to produce a preferred viscosity modifying agent for use in the present invention.

A 15 percent solution of Fluorel FC-2175 in reagent grade acetone was prepared and pressure-filtered through a 0.2 $\mu$ nylon cartridge filter. The clear filtrate was concentrated on a rotary evaporator under reduced pressure and was then dried under vacuum to yield the desired purified material.

Example 4: Preparation and use of cladding composition

This Example illustrates the preparation of a preferred cladding composition of the present invention containing a fluorosubstituted diacrylate monomer, and the application of this cladding composition to an optical fiber.

115.4 g. of pentadecafluorooctyl acrylate sold by Minnesota Mining and Manufacturing Company, St. Paul, Minn. under the tradename FC-5165), 36.0 g. of octafluorohexamethylene diacrylate (prepared in Example 1 above) and 3.6 g. of DMPA were mixed in a beaker and warmed over a steam bath in a fume hood until a homogeneous solution was obtained. This solution was poured into a 250 ml. round-bottomed flask containing the 25 g. of purified Fluorel produced in Example 2 above, and a magnetic stirring bar was placed in the flask. The flask was then placed in an oil bath located in a fume hood with its lights off (to prevent premature curing of the mixture), this oil bath being provided with a thermometer and disposed on a combination magnetic stirrer/hot plate. The bath was heated to approximately 120° C. and the mixture magnetically stirred for several hours until a homogeneous, light yellow, viscous solution was obtained. While still hot, the solution was carefully transferred into a 100 ml. dark amber bottle with a Polyseal cap for storage. The resultant clear, light yellow solution was of low volatility and had a Brookfield viscosity of approximately 4500 cP. at 25° C.

To test the refractive index of the cured form of this solution, two 25 mm. by 75 mm. glass microscope slides were spaced about 0.5 mm. apart. The gap between the slides was filled with the solution, which was cured in air for less than 1 minute approximately 5 cm. beneath a water-cooled 450 Watt ultraviolet mercury vapor lamp. The solution cured to produce a clear, soft film with $n_D^{20} = 1.378$.

The solution was coated onto optical fibers using the apparatus shown schematically in the accompanying drawing. This apparatus, generally designated 10, comprised an oven 12 containing a glass preform. Beneath the oven 12 were disposed two coating cups 14 and 16, each containing the cladding solution prepared above. An ultraviolet lamp 18 (a Fusion Research electrodeless ultraviolet mercury vapor lamp) was disposed below the coating cup 16, and a capstan 20 was disposed below the lamp 18. The apparatus further comprised a wind-up roll 22.

An optical fiber 24 was drawn from the oven 12 at a rate of approximately 0.5 m/sec. by the capstan 20, and passed through the coating cups 14 and 16. These cups were provided with downwardly-tapering conical bases, with the apex of each cone having a vertical bore passing therethrough, the diameter of this bore being equal to the desired diameter of the optical fiber coated with the cladding solution, so that the bore wipes excess cladding solution from the fiber. The fiber, with the uncured cladding solution thereon, was then traversed past the lamp 18, where the solution was cured to produce an adherent clear, soft cladding on the optical fiber.

When the above procedure was used to coat the core and first cladding of an optical fiber laser as shown in FIG. 2 of the aforementioned U.S. Pat. No. 4,815,079, this first cladding having an elliptical cross-section of approximately 110 by 40 μ, the cured composition of the present invention formed a coherent layer approximately 15 μ thick surrounding the first cladding. The numerical aperture of the resultant optical fiber was approximately 0.4.

Example 5: Preparation and use of cladding composition containing unsubstituted diacrylate monomer This Example illustrates how a cladding composition of the present invention containing an unsubstituted diacrylate monomer could be prepared.

A cladding solution is prepared in the same way as in Example 3 but using 10 parts by weight of 1,6-hexanediol diacrylate (obtained from Aldrich Chemical Co.) as the diacrylate monomer, 74 parts by weight of pentadecafluorooctyl acrylate as the fluorinated monofunctional acrylate monomer, 2 parts by weight of DMPA as the photoinitiator and 14 parts by weight of purified Fluorel FC-2175 as the viscosity modifying agent. The resultant cladding solution may be applied to optical fibers using the same technique as in Example 3.

Attention is directed to the copending application of Richard A. Minns, Ser. No. 07/521,642, of even date entitled "Photopolymerizable composition for cladding optical fibers" [Applicant's reference C-7602] which discloses cladding compositions related to those used in the process of the present invention, and processes for the use of such compositions.

We claim:

1. A photopolymerizable composition capable of being polymerized upon exposure to ultraviolet light, the composition forming upon photocuring a cured composition having a refractive index not greater than about 1.43, and comprising a substantially homogeneous mixture of:
   a) an unsubstituted or fluorosubstituted diacrylate monomer;
   b) a fluorinated monofunctional acrylate monomer in an amount of from about 2 to about 12 parts by weight per part by weight of the diacrylate monomer;
   c) a photoinitiator; and
   d) a viscosity modifying agent in an amount sufficient to increase the viscosity of the composition to a value in the range of from about 1000 to about 15000 cP.

2. A composition according to claim 1 wherein the fluorosubstituted diacrylate monomer contains at least about 25 percent by weight fluorine.

3. A composition according to claim 1 wherein the fluorosubstituted diacrylate monomer comprises at least one compound of one of the formulae:

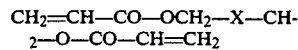

and

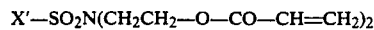

where X is a perfluoroalkylene grouping, or a perfluoroalkylene grouping in which one or more carbon atoms have been replaced by —O—linkages, and X' is a perfluoroalkyl group.

4. A composition according to claim 3 wherein the fluorosubstituted diacrylate monomer comprises octafluorohexamethylene diacrylate.

5. A composition according to claim 1 wherein the diacrylate monomer is an unsubstituted diacrylate monomer.

6. A composition according to claim 5 wherein the unsubstituted diacrylate monomer comprises at least one diacrylate of an alpha,omega alkylene diol containing from about 4 to about 12 carbon atoms.

7. A composition according to claim 6 wherein the unsubstituted diacrylate monomer comprises 1,6-hexanediol diacrylate.

8. A composition according to claim 1 wherein fluorinated monofunctional acrylate monomer comprises at least one compound of the formula:

$$CH_2=CH-CO-OCH_2-Y-T$$

where Y is a perfluoroalkylene grouping and T is fluorine or a $-CF_2H$ group.

9. A composition according to claim 8 wherein fluorinated monofunctional acrylate monomer comprises pentadecafluorooctyl acrylate.

10. A composition according to claim 1 comprising from about 3 to about 9 parts by weight of the fluorinated monofunctional acrylate monomer per part by weight of the diacrylate monomer.

11. A composition according to claim 1 wherein the viscosity modifying agent comprises a fluorocarbon polymer having a refractive index not greater than about 1.40.

12. A composition according to claim 11 wherein the viscosity modifying agent comprises a copolymer of vinylidene fluoride an hexafluoropropylene, or a terpolymer of vinylidene fluoride, hexafluoropropylene and tetrafluoroethylene.

13. A composition according to claim 11 wherein the viscosity modifying agent comprises from about 10 to about 25 percent by weight of the total composition.

14. A composition according to claim 1 which is essentially free from thiols.

15. A process for cladding an optical fiber, which process comprises contacting the fiber with a photopolymerizable composition comprising a substantially homogeneous mixture of:
a) an unsubstituted or fluorosubstituted diacrylate monomer;
b) a fluorinated monofunctional acrylate monomer in an amount of from about 2 to about 12 parts by weight per part by weight of the diacrylate monomer;
c) a photoinitiator; and
d) a viscosity modifying agent in an amount sufficient to increase the viscosity of the composition to a value in the range of from about 1000 to about 15000 cP.,
thereby coating the optical fiber with a layer of the photopolymerizable composition, and thereafter exposing the coated optical fiber to ultraviolet light, thereby curing the photopolymerizable composition to produce on the optical fiber a cladding having a refractive index not greater than about 1.43.

16. A process according to claim 15 wherein the fluorosubstituted diacrylate monomer contains at least about 25 percent by weight fluorine.

17. A process according to claim 15 wherein the fluorosubstituted diacrylate monomer comprises at least one compound of one of the formulae:

$$CH_2=CH-CO-OCH_2-X-CH_2-O-CO-CH=CH_2$$

and $$X'-SO_2N(CH_2CH_2-O-CO-CH=CH_2)_2$$

where X is a perfluoroalkylene grouping, or a perfluoroalkylene grouping in which one or more carbon atoms have been replaced by $-O-$ linkages, and X' is a perfluoroalkyl group.

18. A process according to claim 17 wherein the fluorosubstituted diacrylate monomer comprises octafluorohexamethylene diacrylate.

19. A process according to claim 15 wherein the diacrylate monomer is an unsubstituted diacrylate monomer.

20. A process according to claim 19 wherein the unsubstituted diacrylate monomer comprises at least one diacrylate of an alpha,omega alkylene diol containing from about 4 to about 12 carbon atoms.

21. A process according to claim 20 wherein the unsubstituted diacrylate monomer comprises 1,6-hexanediol diacrylate.

22. A process according to claim 15 wherein the fluorinated monofunctional acrylate monomer comprises at least one compound of the formula:

$$CH_2=CH-CO-OCH_2-Y-T$$

where Y is a perfluoroalkylene grouping and T is fluorine or a $-CF_2H$ group.

23. A process according to claim 22 wherein the fluorinated monofunctional acrylate monomer comprises pentadecafluorooctyl acrylate.

24. A process according to claim 15 wherein the photopolymerizable composition comprises from about 3 to about 9 parts by weight of the fluorinated monofunctional acrylate monomer per part by weight of the diacrylate monomer.

25. A process according to claim 15 wherein the viscosity modifying agent comprises a fluorocarbon polymer having a refractive index not greater than about 1.40.

26. A process according to claim 25 wherein the viscosity modifying agent comprises a copolymer of vinylidene fluoride and hexafluoropropylene, or a terpolymer of vinylidene fluoride, hexafluoropropylene and tetrafluoroethylene.

27. A process according to claim 25 wherein the viscosity modifying agent comprises from about 10 to about 25 percent by weight of the total photopolymerizable composition.

28. A process according to claim 15 wherein the photopolymerizable composition is essentially free from thiols.

29. A process according to claim 15 wherein the cladding produced has a refractive index of not more than about 1.40.

30. A clad optical fiber produced by a process according to claim 15.

31. An optical fiber having a cladding comprising a solid solution of a copolymer of vinylidene fluoride and hexafluoropropylene, or a terpolymer of vinylidene fluoride, hexafluoropropylene and tetrafluoroethylene in a copolymer of an unsubstituted or fluorosubstituted diacrylate monomer with a fluorinated monofunctional acrylate monomer, the copolymer comprising from about 2 to about 12 parts by weight of the fluorinated monofunctional acrylate monomer per part by weight of the diacrylate monomer, the cladding having a refractive index of not more than about 1.43.

32. An optical fiber according to claim 31 wherein the cladding has a refractive index of not more than about 1.40.

33. A photopolymerizable composition capable of being polymerized upon exposure to ultraviolet light, the composition comprising a substantially homogeneous mixture of:

a) an unsubstituted or fluorosubstituted diacrylate monomer;
b) a fluorinated monofunctional acrylate monomer in an amount of from about 2 to about 12 parts by weight per part by weight of the diacrylate monomer;
c) a photoinitiator.

34. A photopolymerizable composition according to claim 33 wherein the diacrylate monomer is an unsubstituted diacrylate monomer.

* * * * *